United States Patent
Zhao et al.

(10) Patent No.: US 10,255,913 B2
(45) Date of Patent: Apr. 9, 2019

(54) AUTOMATIC SPEECH RECOGNITION FOR DISFLUENT SPEECH

(71) Applicant: GM Global Technology Operations LLC, Detroit, MI (US)

(72) Inventors: Xufang Zhao, Windsor (CA); Gaurav Talwar, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 219 days.

(21) Appl. No.: 15/046,303

(22) Filed: Feb. 17, 2016

(65) Prior Publication Data

US 2017/0236511 A1 Aug. 17, 2017

(51) Int. Cl.
| | | |
|---|---|---|
| G10L 15/00 | (2013.01) | |
| G10L 15/22 | (2006.01) | |
| G10L 15/01 | (2013.01) | |
| G10L 15/19 | (2013.01) | |
| G10L 25/60 | (2013.01) | |
| G10L 15/10 | (2006.01) | |
| G10L 15/14 | (2006.01) | |

(52) U.S. Cl.
CPC ............. *G10L 15/22* (2013.01); *G10L 15/01* (2013.01); *G10L 15/10* (2013.01); *G10L 15/19* (2013.01); *G10L 25/60* (2013.01); *G10L 15/142* (2013.01); *G10L 15/144* (2013.01); *G10L 2015/223* (2013.01)

(58) Field of Classification Search
CPC ...................................................... G10L 15/00
USPC ................ 704/500, 240, 251, 257, 235, 254
See application file for complete search history.

(56) References Cited

U.S. PATENT DOCUMENTS

| | | | | |
|---|---|---|---|---|
| 5,634,086 A * | 5/1997 | Rtischev | ................ | G09B 19/06 434/185 |
| 5,832,430 A * | 11/1998 | Lleida | .................. | G10L 15/142 704/231 |
| 6,850,882 B1 * | 2/2005 | Rothenberg | ............ | G10L 25/00 704/211 |
| 8,494,857 B2 * | 7/2013 | Pakhomov | ............ | G10L 15/005 704/270 |
| 2002/0156627 A1 * | 10/2002 | Itoh | ........................ | G10L 15/187 704/254 |
| 2006/0111902 A1 * | 5/2006 | Julia | ......................... | G09B 5/06 704/236 |
| 2006/0200350 A1 * | 9/2006 | Attwater | ................. | G10L 15/08 704/251 |
| 2007/0129936 A1 * | 6/2007 | Wang | .................. | G06F 17/2785 704/9 |
| 2008/0059188 A1 * | 3/2008 | Konopka | ................ | G10L 15/22 704/257 |
| 2008/0140401 A1 * | 6/2008 | Abrash | .................. | G09B 19/06 704/251 |
| 2008/0195387 A1 * | 8/2008 | Zigel | ...................... | G10L 17/06 704/236 |

(Continued)

*Primary Examiner* — Michael C Colucci
(74) *Attorney, Agent, or Firm* — Reising Ethington P.C.; David Willoughby

(57) ABSTRACT

A system and method of processing disfluent speech at an automatic speech recognition (ASR) system includes: receiving speech from a speaker via a microphone; determining the received speech includes disfluent speech; accessing a disfluent speech grammar or acoustic model in response to the determination; and processing the received speech using the disfluent speech grammar.

12 Claims, 3 Drawing Sheets

(56) References Cited

U.S. PATENT DOCUMENTS

| | | | |
|---|---|---|---|
| 2009/0210232 A1* | 8/2009 | Sanchez | G10L 15/22 704/275 |
| 2010/0246837 A1* | 9/2010 | Krause | G10L 15/063 381/58 |
| 2011/0144993 A1* | 6/2011 | Ruby | G10L 17/26 704/243 |
| 2012/0116772 A1* | 5/2012 | Jones | G06F 19/3418 704/270 |
| 2013/0226576 A1* | 8/2013 | Jaiswal | G10L 21/003 704/235 |
| 2013/0304472 A1* | 11/2013 | Pakhomov | G10L 17/26 704/254 |
| 2013/0325448 A1* | 12/2013 | Levien | G10L 19/00 704/201 |
| 2013/0325451 A1* | 12/2013 | Levien | G10L 21/00 704/201 |
| 2014/0039895 A1* | 2/2014 | Aravamudan | G10L 15/187 704/257 |
| 2015/0348546 A1* | 12/2015 | Sun | G10L 21/02 704/233 |
| 2015/0371628 A1* | 12/2015 | Kreifeldt | G10L 15/02 704/254 |
| 2016/0379638 A1* | 12/2016 | Basye | G06F 17/30764 704/235 |

* cited by examiner

AUTOMATIC SPEECH RECOGNITION FOR DISFLUENT SPEECH

TECHNICAL FIELD

The present invention relates to automatic speech recognition (ASR) and, more particularly, to ASR for disfluent speech.

BACKGROUND

Automatic speech recognition (ASR) is used to interpret speech received from people in a wide variety of applications. Generally, a person listens to audible prompts or commands and provides spoken responses to those prompts. An ASR system can process the spoken responses to interpret their content and carryout actions that are appropriate. The success with which the ASR system determines the content of the spoken responses can be largely based on the clarity of the spoken responses. However, many people have difficulty clearly enunciating words and phrases. For instance, people may stutter, stammer, or otherwise be unable to generate spoken responses in a timely manner. The ASR system may be programmed using assumptions of what speech sounds like without these difficulties. And as a result, the ASR system may not accurately interpret speech when provided by people who have difficulty speaking.

SUMMARY

According to an embodiment of the invention, there is provided a method of processing disfluent speech at an automatic speech recognition (ASR) system. The method includes receiving speech from a speaker via a microphone; determining the received speech includes disfluent speech; accessing a disfluent speech grammar or acoustic model in response to the determination; and processing the received speech using the disfluent speech grammar.

According to another embodiment of the invention, there is provided a method of processing disfluent speech at an automatic speech recognition (ASR) system. The method includes receiving speech from a speaker via a microphone; classifying the received speech according to one of a plurality of different disfluent speech types; modifying one or more ASR variables that compensate for the classified disfluent speech type; and processing the received speech using the modified ASR variables.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below involves an ASR system that receives speech from users and interprets its content. As part of interpreting the received speech, the ASR system can be configured to determine when disfluent speech is present and then compensate for the disfluent speech so that it can be successfully interpreted. Generally speaking, disfluent speech or speech disfluency describes speech that includes breaks, irregularities, grunts, or non-lexical sounds that occur within received speech. Disfluent speech can be caused by a number of different factors, such as old age, accidents, stroke, or hemiplegia (e.g., Bell's Palsy). The disfluent speech can be identified not only by its presence but also by the type of disfluent speech that is received. For example, disfluent speech types include a stammer, stutter, excessive breath, slow rate, or nasality. The ASR system can compensate for disfluent speech by building and deploying statistical language models that are optimized to understand disfluent speech in general or specific types of disfluent speech. It is also possible to alter one or more ASR variables that are usually established to facilitate the recognition of fluent speech. Having identified the type of speech disorder or dysarthia, it is possible to use a dedicated acoustic model to improve speech recognition performance. This will be discussed in more detail below.

Communications System

Figure 1:
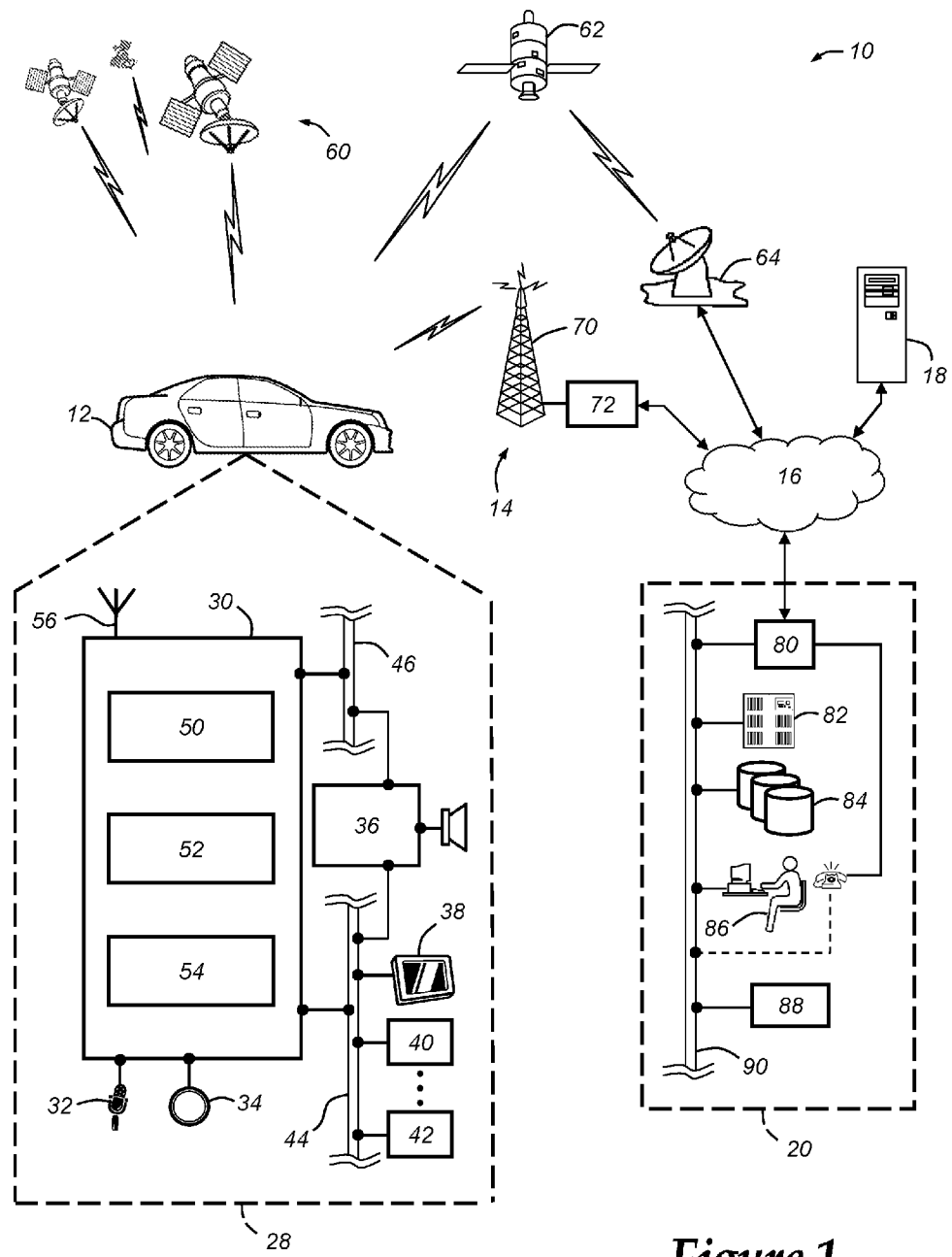
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
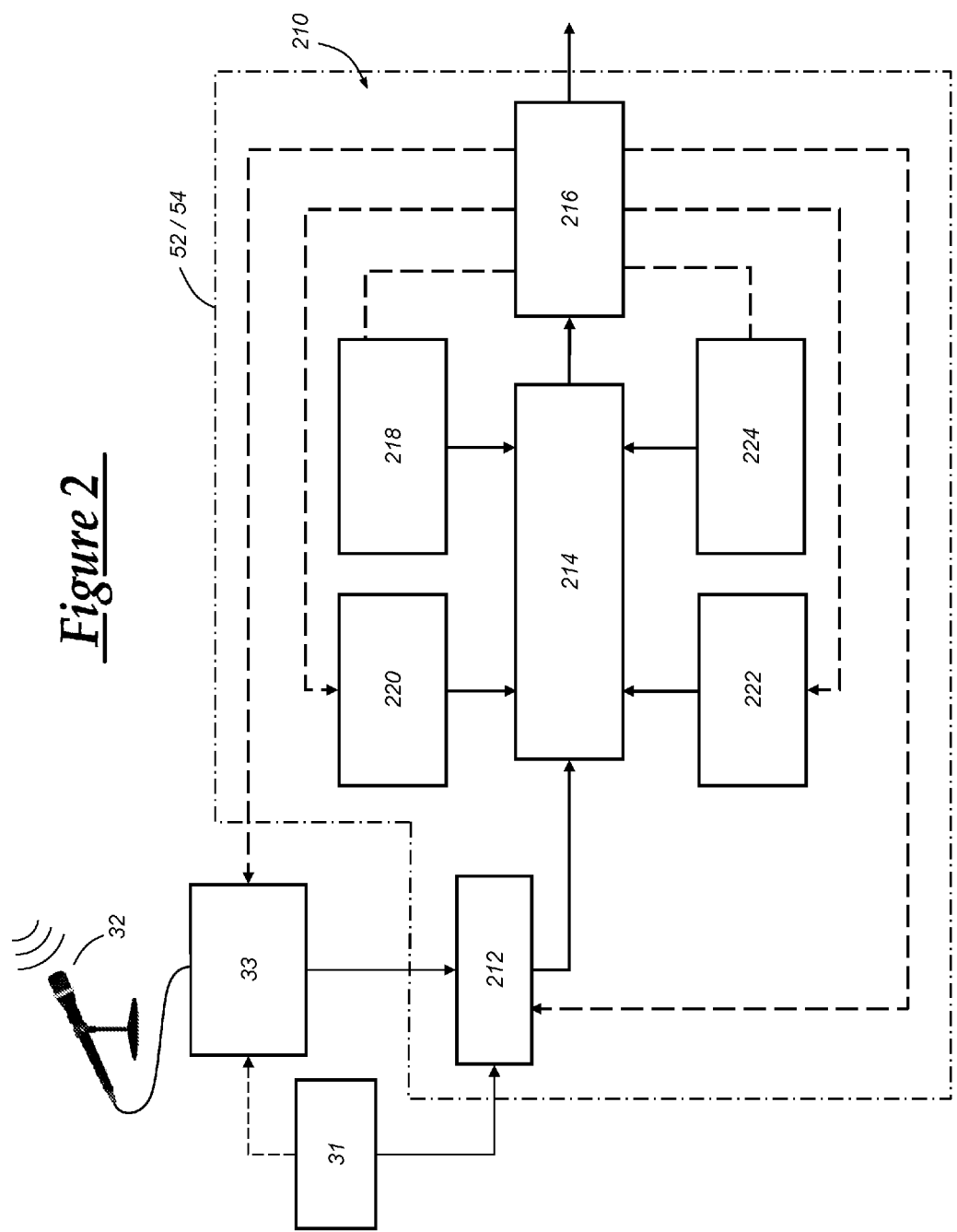
FIG. 2 is a block diagram depicting an embodiment of an automatic speech recognition (ASR) system.

Turning now to FIG. 2, there is shown an illustrative architecture for an ASR system 210 that can be used to enable the presently disclosed method. In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 2 illustrates just one specific illustrative ASR system 210. The system 210 includes a device to receive speech such as the telematics microphone 32, and an acoustic interface 33 such as a sound card of the telematics unit 30 having an analog to digital converter to digitize the speech into acoustic data. The system 210 also includes a memory such as the telematics memory 54 for storing the acoustic data and storing speech recognition software and databases, and a processor such as the telematics processor 52 to process the acoustic data. The processor functions with the memory and in conjunction with the following modules: one or more front-end processors or pre-processor software modules 212 for parsing streams of the acoustic data of the speech into parametric representations such as acoustic features; one or more decoder software modules 214 for decoding the acoustic features to yield digital subword or word output data corresponding to the input speech utterances; and one or more post-processor software modules 216 for using the output data from the decoder module(s) 214 for any suitable purpose.

The system 210 can also receive speech from any other suitable audio source(s) 31, which can be directly communicated with the pre-processor software module(s) 212 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module(s) 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative illustrative embodiment, some or all of the ASR system 210 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 210 can be resident in the telematics unit 30, distributed across the call center 20 and the vehicle 12 in any desired manner, and/or resident at the call center 20.

First, acoustic data is extracted from human speech wherein a vehicle occupant speaks into the microphone 32, which converts the utterances into electrical signals and communicates such signals to the acoustic interface 33. A sound-responsive element in the microphone 32 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 212 transforms the continuous stream of digital speech data into discrete sequences of acoustic parameters. More specifically, the processor 52 executes the pre-processor module(s) 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module(s) 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 214 to process the incoming feature vectors of each test pattern. The decoder module(s) 214 is also known as a recognition engine or classifier, and uses stored known reference patterns of speech. Like the test patterns, the reference patterns are defined as a concatenation of related acoustic frames and corresponding parameters. The decoder module(s) 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Illustrative parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module(s) 216 receives the output data from the decoder module(s) 214 for any suitable purpose. In one example, the post-processor software module(s) 216 can identify or select one of the reference patterns from the N-best list of single or multiple word reference patterns as recognized speech. In another example, the post-processor module(s) 216 can be used to convert acoustic data into text or digits for use with other aspects of the ASR system or other vehicle systems. In a further example, the post-processor module(s) 216 can be used to provide training feedback to the decoder 214 or pre-processor 212. More specifically, the post-processor 216 can be used to train acoustic models for the decoder module(s) 214, or to train adaptation parameters for the pre-processor module(s) 212.

The method or parts thereof can be implemented in a computer program product embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Method

Figure 3:
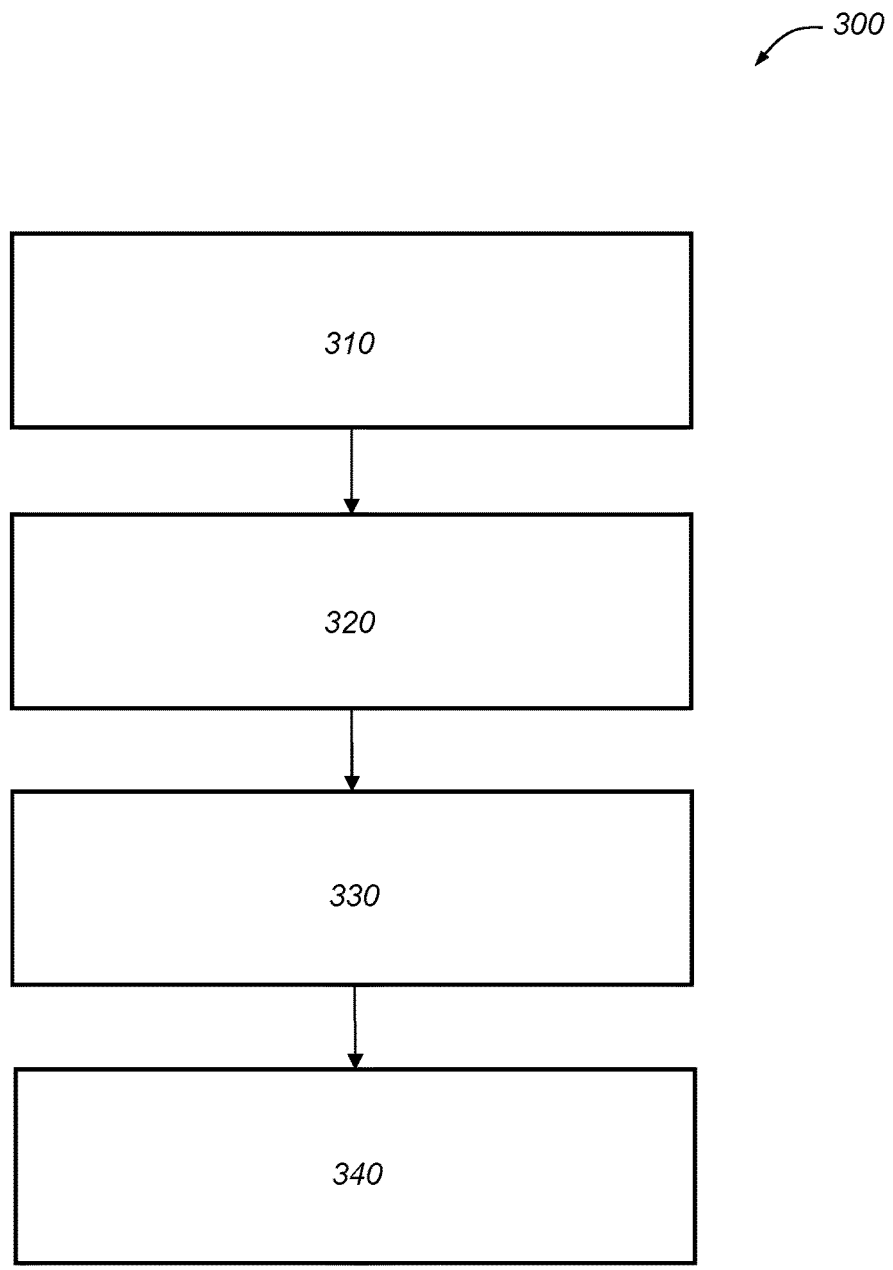
FIG. 3 is a flow chart depicting an embodiment of a method of processing disfluent speech at an automatic speech recognition (ASR) system.

Turning now to FIG. 3, there is shown a method of processing disfluent speech using the ASR system 210. The method 300 begins at step 310 by receiving speech from a speaker via the microphone 32. A vehicle occupant can initiate the ASR system 210 and place it in a state in which the system 210 listens for speech. The pre-processor modules 212 can then extract acoustic parameters from the speech in the form of acoustic data that can be analyzed to determine whether the received speech is disfluent or fluent. The method 300 proceeds to step 320.

At step 320, the ASR system 210 determines that the received speech includes disfluent speech. The pre-processor module 212 can pass the received speech to the decoder modules 214 that use HMM engines to generate a best hypothesis corresponding to the most probable utterance or subword sequence for a given observation sequence of acoustic feature vectors. The hypothesis can take the form of a confidence value indicating how likely the hypothesis is correct. When this confidence value is above a particular threshold, the ASR system 210 can determine that the received speech is fluent and proceed to process the remaining speech. However, if the confidence value falls below this threshold, the ASR system 210 can determine that the received speech includes disfluent speech. In parallel, additional pattern classification techniques could be employed to categorize the given speech segment as normal or "disfluent" speech.

The HMM engines can be effective at identifying disfluent speech. Even though disfluent speech may appear to a listener as lacking organization and/or meaning, the MINI engines can identify seemingly unorganized sound as disfluent speech rather than meaningless sound. For example, the HMM can identify the varied pitch and tone associated with speech even though the content of that speech may not be decipherable. In contrast, non-speech utterances in the form of noise generally have non-varying pitch and tone. Therefore, even though the ASR system 210 may generate a confidence value that falls below a particular threshold, the ASR system 210 can rely on the HMM engine to identify the incoming sound as speech that it cannot confidently recognize rather than random noise.

In addition to identifying the presence of disfluent speech, the HMM engine can also classify the type of disfluent speech that is received. The ASR system 210 can be configured to receive a disfluent speech classification from the HMM engine. Types of disfluent speech classifications include stammer, excessive breath (breathy speech), slow rate, and nasality. The HMM engine can be previously trained to identify each of these classifications using people whose speech can be characterized by each of these classifications. Training data in the form of speech for each category of these speech disorders is readily available. A number of perceived speech attributes belonging to disfluent speech can be identified by the HMM engine, such as pitch, loudness, voice quality, prosody, respiration, and articulation. The HMM can be trained with people who repeat syllables of a particular word as part of a stammer or tend to breath heavily while speaking for an excessive breath classification. Also, the HMM can be trained using people who speak unusually slowly or nasally. Based on the conclusion that disfluent speech exists and a classification of the particular type of disfluent speech, the ASR system 210 can alter the way it processes the received speech. The method 300 proceeds to step 330.

At step 330, the ASR system 210 processes the disfluent speech differently than it processes fluent speech. The ASR system 210 can access a speech grammar 218, an acoustic model 220, or both that has been optimized for disfluent speech in general or a particular type of disfluent speech that had been identified by the ASR system 210. For example, the ASR system 210 can store an acoustic model 220 for disfluent speech that is selected in response to a determination that disfluent speech is present. Or the ASR system 210 can store individual speech grammars 218 and acoustic models 220 for each type of disfluent speech. That way, when the ASR system 210 identifies a type of disfluent speech, the individual speech grammar 218 or acoustic model 220 that has been generated for that type of disfluent speech can be selected for use by the decoder 214 to generate a more accurate hypothesis of speech content.

Alternatively, or additionally, the ASR system 210 can modify one or more ASR variables that compensate for the classified disfluent speech type. For example the ASR system 210 can load a disfluent ASR variable set that changes variables such as the maximum speech timeout value or error values that permit repetition of command words. The disfluent ASR variable set can allow a vehicle occupant more time to respond to audible prompts and more flexibility to repeat command words without the ASR system 210 generating error prompts. The method 300 proceeds to step 340.

At step 340, the disfluent speech is processed using the disfluent speech grammar, the modified ASR variables, or both. After processing the disfluent speech using a grammar model 218 and/or acoustic model 220 selected for disfluent speech, the decoder module 214 can output a best hypothesis for the disfluent speech to the post-processor module 216. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of processing disfluent speech at an automatic speech recognition (ASR) system having an electronic processor and a database, comprising the steps of:
   (a) receiving speech from a speaker via a microphone;
   (b) determining the received speech includes disfluent speech and determining the classification of received speech using a Hidden Markov Model (HMM), wherein the HMM is trained using speakers that have a speech disorder or speakers that speak as though they have a speech disorder;
   (c) accessing a disfluent speech grammar or acoustic model in response to step (b); and (d) after steps (b) and (c), processing the received speech using the disfluent speech grammar, wherein the processing of the received speech includes using the disfluent speech grammar to generate a more accurate hypothesis of speech content, and wherein one or more of steps (b), (c), and (d) are performed using the electronic processor, and at least some data relating to the received speech, the HMM, the disfluent speech grammar, or the acoustic model is stored in the database.

2. The method of claim 1, wherein the speaker is a vehicle occupant.

3. The method of claim 1, further comprising the step of classifying the received speech according to one or more types of disfluent speech.

4. The method of claim 1, wherein the disfluent speech grammar or acoustic model is stored at a vehicle.

5. The method of claim 1, wherein the received speech is determined to include disfluent speech based on a speech hypothesis that falls below a predetermined threshold.

6. A method of processing disfluent speech at an automatic speech recognition (ASR) system having an electronic processor and a database, comprising the steps of:
   (a) receiving speech from a speaker via a microphone;
   (b) classifying the received speech according to one of a plurality of different disfluent speech types, wherein the plurality of different disfluent speech types includes stammer, excessive breath, or nasality;
   (c) modifying one or more ASR variables that compensate for the classified disfluent speech type; and
   (d) after steps (b) and (c), processing the received speech using the modified ASR variables, wherein the processing of the received speech includes using the modified ASR variables to generate a more accurate hypothesis of speech content, and wherein one or more of steps (b), (c), and (d) are performed using the electronic processor, and at least some data relating to the received speech or the modified ASR variables is stored in the database.

7. The method of claim 6, wherein the speaker is a vehicle occupant.

8. The method of claim 6, wherein step (b) further comprises determining the classification of received speech using a Hidden Markov Model (HMM).

9. The method of claim 8, wherein the HMM is trained using speakers providing disfluent speech.

10. The method of claim 6, wherein the disfluent speech grammar or acoustic model is stored at a vehicle.

11. The method of claim 6, wherein the received speech is determined to include disfluent speech based on a speech hypothesis that falls below a predetermined threshold.

12. A method of processing disfluent speech at an automatic speech recognition (ASR) system having an electronic processor and a database, comprising the steps of:
   (a) receiving speech from a speaker via a microphone;
   (b) classifying the received speech according to one of a plurality of different disfluent speech types, wherein the classification of received speech uses a Hidden Markov Model (HMM), wherein the HMM is trained using speakers and the HMM is trained to identify a within word difluence resulting from a stammer, excessive breath, slow rate, or nasality;
   (c) modifying one or more ASR variables that compensate for the stammer, excessive breath, slow rate, or nasality of the classified disfluent speech type, wherein the one or more ASR variables includes increasing response time for audible prompts, allowing repetitive command words, or both; and
   (d) processing the received speech using the modified ASR variables by increasing response time for audible prompts, allowing repetitive command words, or both, wherein one or more of steps (b), (c), and (d) are performed using the electronic processor, and at least some data relating to the received speech, the HMM, or the modified ASR variables is stored in the database.

* * * * *